Nov. 14, 1967  L. LERICH  3,352,193
REMOVABLE ANCHOR BOLT
Filed Oct. 18, 1965

INVENTOR.
LESTER LERICH
BY John E. Reilly
ATTORNEY

United States Patent Office

3,352,193
Patented Nov. 14, 1967

3,352,193
REMOVABLE ANCHOR BOLT
Lester Lerich, 30 Morningside Drive,
Lakewood, Colo. 80215
Filed Oct. 18, 1965, Ser. No. 496,902
3 Claims. (Cl. 85—79)

This invention generally relates to novel and improved fasteners, and more particularly relates to a removable anchor bolt which is so constructed and arranged as to be capable of positive expansion into anchored relation to the surrounding wall of a bolt hole as well as to be selectively releasable in the event it is desired to remove the bolt from the hole.

The present invention is specifically directed to an improved anchor bolt of the general type set forth in Patent No. 2,896,494 entitled, "Anchor Bolt With Nut Actuated Expansion Wedges." In that patent there is described the novel construction of an anchor bolt having expansion wedges wherein each wedge is provided with a guide rod extending through external grooves in the bolt portion for engagement along a threaded portion by actuating means defined by a washer and lock nut. There, the nut upon inward threading along the bolt will act through the washer and guide rods to force the expansion wedges outwardly into anchored relation against the wall of the bore or bolt hole. Once installed in that manner, however, it is difficult to remove the bolt since the wedges are slanted in a direction to resist movement of the bolt in a direction displacing it from the hole. In other words, upon loosening the bolt and wedges no means is provided for retaining the wedges in a retracted position away from wedging engagement with the wall of the hole as the bolt is withdrawn. Accordingly, it is an object of the present invention to provide an anchor bolt of the general character described which incorporates improved releasable actuating means to positively anchor the bolt in place as well as to selectively release the bolt from anchored relation within the hole for removal therefrom.

Another object of the present invention is to provide an anchor bolt in which the bolt portion closely corresponds in size with the diameter of the bolt hole yet includes expansion elements being controlled for movement into and out of expanded relation within the hole and wherein such movement can be positively controlled externally of the hole.

It is a further object of the present invention to provide an anchor bolt with expansion wedge members thereon having guide rods attached to improved actuating means in such a way as to enable positive expansion and retraction of the wedge members without damaging the wall structure or fixture in which the bolt is anchored and where the expansion wedge members and guide rods are normally secured within the peripheral outline of the bolt for easy insertion and removal from the hole.

It is a still further object of the present invention to provide actuating means for use in association with an anchor bolt of the character described in which said actuating means are conformable for use with various forms of anchor bolts and expansion wedge members for establishing positive anchored relation of the bolt in different types of materials, such as, masonry, stone, concrete, plastic, steel and other non-frangible materials while being capable of retaining the wedge members in retracted relation on the bolt for removal from the hole.

The above and other objects, advantages and features of the present invention will become more readily appreciated and understood from a consideration of the following description of preferred and modified forms of the present invention when taken together with the accompanying drawings, in which.

Figure 1:
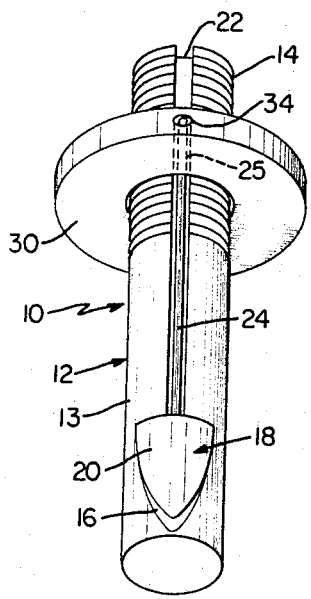
FIGURE 1 is a perspective view of a preferred form of anchor bolt.
Figure 2:
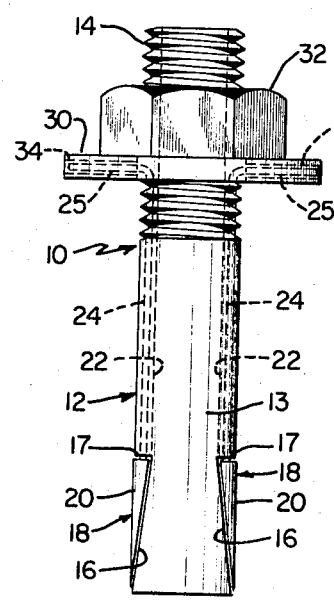
FIGURE 2 is an elevational view of an anchor bolt shown in FIGURE 1.

Referring in detail to the drawings, there is shown in FIGURES 1 and 2 a preferred form of anchor bolt 10 which is broadly comprised of a cylindrical shank 12 of uniform diameter having a forward smooth portion 13 and a rearward threaded portion 14. The external surface of the smooth portion 13 has formed adjacent to the forward extremity a plurality of generally wedge-shaped recesses or pockets 16, there being illustrated a pair of diametrically opposed recesses which specifically are wedge-shaped in section lengthwise of the shank. Accordingly, each recess 16 slants rearwardly and inwardly toward the axis of the shank from adjacent the forward extremity and terminates in an end surface 17 squared to the length of the shank. Each recess therefore defines a slanted bearing surface for insertion of a correspondingly wedge-shaped expansion member 18 and each expansion wedge member 18 preferably conforms in size and shape to that of a recess 16 so as to lie within the recess with its external curved surface 20 normally flush with the peripheral outline of the shank and with its relatively thick rearward end abutting the end surface 17. A longitudinally extending, rod-receiving groove 22 extends rearwardly from communication with each of the end surfaces 17 and continues along and through the threaded end portion 14 to the rearward extremity of the bolt. Here, each groove 22 is relatively shallow compared to the depth of the recess but nevertheless is of sufficient depth preferably to permit full insertion of a longitudinal guide rod 24 therein. In turn, each guide rod is affixed to the rearward end of each expansion wedge member next to its external surface 20 and extends rearwardly to terminate at a point within the groove approximately midway along the threaded portion. The rearward extremity of each guide rod is further provided with a connecting end portion 25 which projects at right angles in a radially outward direction from the groove for attachment to the actuating means and in a manner now to be described.

In accordance with the present invention, the expansion wedge members 18 are controlled in expansion and retraction by actuating members which are defined by washer 30 and nut 32. The body of the washer 30 is relatively thick and has an internal diameter closely corresponding to the external diameter of the threaded portion but with enough clearance therebetween to permit linear non-rotative advancement of the washer axially of the bolt under the urging of the nut 32 which is positioned behind the washer 30. By establishing a positive connection between the connecting end portions 25 on the guide rods and the washer 30, it will be seen generally that as the washer is advanced forwardly along the threaded portion such movement is imparted to the guide rods and in turn to the wedges 18 thereby forcing the latter to slide outwardly into protruding relation from the recesses and from the external surface of the bolt into expanded, anchored relation against the surrounding wall of the bolt hole. Conversely, when the washer 30 is returned in a rearward direction along the threaded portion, due to its positive connection to the guide rods, the rods will be drawn rearwardly with the washer to retract the wedges 18 inwardly into retracted relation within the recesses thus releasing the bolt for removal from the bolt hole.

In the preferred form of invention shown in FIGURES 1 and 2, positive interconnection between the guide rods 22 and washer 30 is effected by forming diametrically opposed, radially extending bores 34 within the body of the washer 30 to receive the connecting end portions 25, and most desirably the connecting end portions 25 project radially away from the bolt portion for a distance sufficient to extend through the greater width of the washer on either side. Although the connecting end portions 25 are not rigidly attached to the washer and will afford some limited play therebetween they will closely follow the movement of the washer and through the guide rods cause the expansion wedge members to closely follow its movement. The guide rods preferably possess some limited flexibility or resilience in order to facilitate their assembly with the washer and for ease of installation on the shank portion prior to placement within a bolt hole. Thus, in assembly the rods are secured to the washer first by inserting the connecting ends 25 through the bores 34, and the washer is then placed over the rearward threaded extremity of the bolt with the guide rods aligned for forward extension along the external grooves 22. Initially, it will be evident that the guide rods must be flexed outwardly over the bolts until the washer is advanced forwardly along the bolt for a sufficient distance for the expansion wedge members to drop into place within the recesses whereupon the guide rods will snap into place within the external grooves and thereafter the nut 32 is in position on the threaded end portion behind the washer. For the purpose of shipping or storage of the bolts, the wedges may be secured in place within the recesses by a suitable retainer band, not shown, but for example of the type described and shown in my hereinbefore referred to Patent No. 2,896,494.

In use, the bolt is dimensioned to correspond closely with the size of the bolt hole so that upon insertion very little expansion of the wedge members is required to establish anchored engagement within the hole. Here again the bolt is designed for use in different materials in which the expansion wedges can establish firm wedging engagement when placed in the hole. In this connection, the external surfaces 20 are preferably roughened to increase their frictional engagement or grip with the wall surface. As the nut 32 is tightened, the expansion wedges will remain stationary but the shank portion will be withdrawn rearwardly or in other words outwardly through the hole thereby forcing the wedges to expand into engagement with the surrounding wall surface and of course the greater the tension exerted on the shank, the greater will be the expansive force of the wedges against th wall surface and the tighter the bolt becomes in the hole with the washer bearing firmly against the external wall of the hole. In order to remove the bolt, the nut 32 is backed off from the washer and, by tapping lightly on the outer extremity of the bolt, the shank is advanced forwardly until the wedges are retracted within the recesses. Using a suitable prying tool such as a claw hammer, screwdriver or the like and by prying up under the washer and lifting away from the bolt hole, the washer acting through the guide rods will retain the wedges in retracted relation within the recesses as the bolt is withdrawn from the hole. Due to the close correspondence in size between the bolt and the hole it may be necessary to shake and twist the bolt slightly in the removal operation but again it is of importance that the washer be grasped and lifted with the bolt so that it will hold the wedge elements firmly in seated relation within the recesses and resist any tendency of the wedges to expand outwardly into wedging engagement with the wall of the hole. In this way, both the bolt and bolt hole are reusable while avoiding damage to or cracking of the wall when the anchor bolt is removed.

Figure 3:
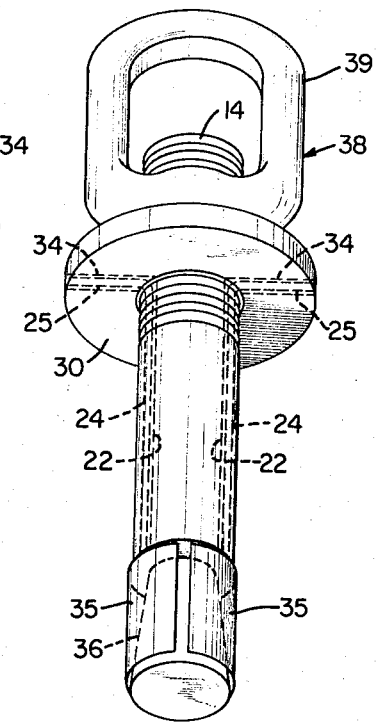
FIGURE 3 is a view of an alternate form of anchor bolt employing semicircular wedge members and further illustrating the use of a removable eye-shaped connector as part of the actuating means for the bolt.
Figure 4:
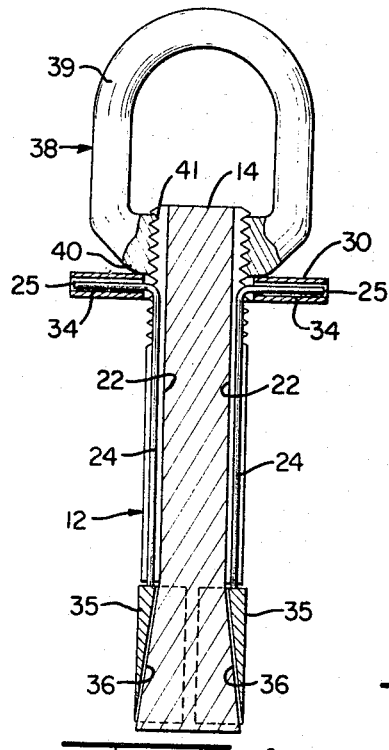
FIGURE 4 is a view partially in section of the alternate form of invention shown in FIGURE 3.

In the embodiment shown in FIGURES 3 and 4 the same principle is illustrated with a modified type of anchor bolt and where like parts are correspondingly enumerated. In this form a pair of semicircular or sleeve-like expansion wedge members 35 are positioned in a circumferential recess 36 on the external surface of the bolt shank adjacent to the forward end. Again the recess is slanted rearwardly and inwardly toward the axis of the shank to terminate in a relatively deep rearward end surface, and a pair of diametrically opposed external grooves 22 extend rearwardly from the recesses for the remaining length of the bolt. The expansion wedge members 35 are correspondingly formed for insertion in the recess 36 and together are positioned in surrounding relation to the forward end of the bolt for the purpose of establishing more uniform wedging engagement with the wall of the bolt hole. Moreover, the washer element 30 is positively connected to the connecting end 25 of the guide rod in the manner desribed in FIGURES 1 and 2; but here in place of an ordinary nut 32 an eyed-shaped connector 38 is utilized for tightening the bolt in anchored relation and consists of a ring-like portion 39 having a relatively thick end section 40 with a threaded bore 41 therein for connection to the threaded portion 14. Accordingly, the anchor bolt of this form of invention may be used in applications ordinarily requiring an eye bolt and where the expansion wedge members will establish firm wedging engagement with the fixture or structure to which it is secured.

Figure 5:
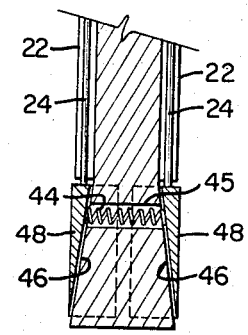
FIGURE 5 is a fragmentary view, in section, of a portion of an anchor bolt having spring-biased expansion wedges.

In FIGURE 5, a bolt is illustrated having a compression spring 44 inserted in a transverse bore 45 extending between diametrically opposed recesses 46. In this form, the recesses may either be of the form shown in FIGURES 1 and 2 or in FIGURES 3 and 4 where the spring will bear against the inner surfaces of the expansion wedge members 48 to bias the wedges outwardly into anchored relation with the surrounding wall surface. This general relation between the spring elements and expansion wedge members is set forth and described in more detail in my co-pending application for Patent S.N. 408,-282, filed Nov. 2, 1964. Again, however, by utilizing guide rods for the expansion wedge members with a positive connection between the rearward ends of the guide rods and a washer element, the wedge members may be effectively held in retracted relation within the recesses notwithstanding the outward biasing of the spring when the bolt is lifted or removed from the bolt hole for example in the manner described in regard to FIGURES 1 and 2.

Figure 6:
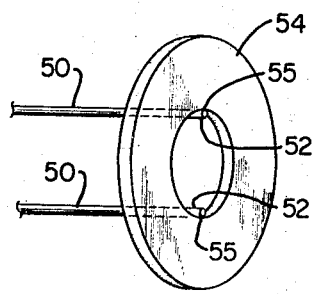
FIGURE 6 is a detailed view of a modified form of washer and guide rod connection.

The form of invention shown in FIGURE 6 illustrates a modified connection between a pair of guide rods 50 having rearward terminal ends 52 affixed to the inner periphery or diameter of a washer element 54. Here the ends of the guide rods may be spot welded as at 55 to the inner surface of the washer to establish a positive connection therebetween. This form of connection would have some practical use in limited applications, such as, smaller sized bolt members where the washers are of limited size and thickness.

From the foregoing, it will be apparent that a number of advantages are realized from the positive connection established between the guide rods and washers especially when connected in the manner set forth and illustrated with reference to FIGURES 1 and 2. Not only will the washer be capable of releasing the wedge members and retaining them in retracted relation for removal from the hole, but the positive connection between the washer and guide rods will restrict any tendency of the washer to turn with the nut. Moreover, the washer will establish a direct positive engagement through the guide rod for expansion of the wedges as well as to secure the guide rods in place for proper sliding action along the grooves.

A particular advantage of the combined washer and guide rod connection is that it may be utilized as a replacement item for separate washer and guide rods now in use in the field, as well as being conformable for use with various types of anchor bolts which employ wedges or other types of expansion members movable along a flared or slanted end surface on the shank into wedging engagement with the wall of an opening or hole.

Accordingly, while preferred and alternate forms of the present invention have been set forth and described herein it will be apparent that various modifications and changes may be made in the particular construction and of elements without departing from the spirit and scope of the present invention as defined by the appended claims.

What is claimed is:

1. An anchor bolt adapted for releasable wedging engagement in a bolt hole comprising a generally cylindrical shank of uniform diameter including a threaded portion at one end and a plurality of wedge-receiving recesses adjacent to the opposite end to be inserted into the hole with an external relatively shallow groove extending rearwardly from each recess lengthwise of said shank and along the threaded portion thereof, an expansion wedge member normally disposed in flush relation within each recess, each wedge member being movable forwardly from the recess into wedging engagement with the wall of the bolt hole and being further movable rearwardly away from wedging engagement into retracted relation within its respective recess, a rearwardly extending narrow elongated guide rod for each of said expansion wedge members, being slidably disposed in a groove and each terminating in a radially and outwardly projecting end portion intermediately along the threaded portion of said shank, and releasable actuating means on the threaded portion of said shank externally of the bolt hole including a relatively flat washer provided with radial bores therein being spaced and aligned for releasable insertion of the connecting end portions of the guide rods, and a locking member threadedly connected to the threaded portion of said shank behind said washer whereupon tightening said locking member to urge said shank in the direction of withdrawal from the hole said washer is cooperative with said guide rods to urge said expansion wedge members outwardly into wedging engagement with the hole and whereupon loosening of said locking member away from said washer and forcing said shank inwardly at a limited distance through the hole said washer is engageable to retain said expansion wedge members in flush relation within the recesses for removal of said bolt from the hole.

2. In an anchor bolt being adapted for insertion in an opening wherein said anchor bolt is provided with a generally cylindrical shank having expansion members at the leading end of said shank and a threaded portion at the opposite end thereof, said expansion members being movable forwardly along inclined surfaces of the shank into anchored relation with the wall of the opening, the combination therewith comprising a narrow elongated guide rod for each of said expansion members, each guide rod extending rearwardly along the peripheral surface of said shank from each expansion member for termination along the threaded portion externally of the opening when the bolt is inserted within the opening and each guide rod terminating in a radially and outwardly projecting end portion, a relatively flat, annular washer being disposed on the threaded portion and being provided with radially extending bores aligned for insertion of the outwardly projecting terminal ends of said guide rods therein to establish releasable but positive interconnection between said washer and said guide rods, and a threaded locking member being positioned on the threaded portion behind said washer whereupon threading said locking member inwardly along the threaded portion, said washer is cooperative with said guide rods to advance said expansion members outwardly into anchored relation with the wall of the opening and, upon threading said locking member outwardly away from said washer and loosening of said expansion members within the opening, said washer is engageable to withdraw said expansion members inwardly away from engagement with the wall of the opening for removal of the bolt therefrom.

3. In an anchor bolt according to claim 2, further including resilient means behind said expansion members biasing said expansion members outwardly away from the inclined surfaces of the shank into anchored relation with the surrounding wall surface of the opening.

References Cited

UNITED STATES PATENTS

| 1,032,106 | 7/1912 | Belton | 85—87 |
| 1,311,038 | 7/1919 | Bowman | 85—79 |
| 3,896,494 | 7/1959 | Lerich | 85—79 |

FOREIGN PATENTS

| 54,293 | 7/1912 | Austria. |
| 536,310 | 1/1957 | Canada. |
| 1,305,740 | 4/1962 | France. |
| 84,373 | 10/1954 | Norway. |

CARL W. TOMLIN, *Primary Examiner.*

MARION PARSONS, Jr., *Examiner.*